(12) United States Patent
Karakasis et al.

(10) Patent No.: US 11,566,530 B2
(45) Date of Patent: Jan. 31, 2023

(54) TURBOMACHINE NOZZLE WITH AN AIRFOIL HAVING A CIRCULAR TRAILING EDGE

(71) Applicant: General Electric Company, Schenectady, NY (US)

(72) Inventors: Marios Karakasis, Fislisbach (CH); Konstantin Valerievich Ivanov, Turgi (CH)

(73) Assignee: General Electric Company, Schenectady, NY (US)

( * ) Notice: Subject to any disclaimer, the term of this patent is extended or adjusted under 35 U.S.C. 154(b) by 17 days.

(21) Appl. No.: 16/695,298

(22) Filed: Nov. 26, 2019

(65) Prior Publication Data

US 2021/0156340 A1 May 27, 2021

(51) Int. Cl.
*F02K 3/06* (2006.01)
*F01D 9/04* (2006.01)
*F01D 5/14* (2006.01)
*B64D 27/16* (2006.01)

(52) U.S. Cl.
CPC ............. *F01D 9/041* (2013.01); *F01D 5/141* (2013.01); *F01D 9/04* (2013.01); *F02K 3/06* (2013.01); *B64D 27/16* (2013.01); *F05D 2220/323* (2013.01); *F05D 2240/121* (2013.01); *F05D 2240/122* (2013.01); *F05D 2240/123* (2013.01); *F05D 2240/124* (2013.01)

(58) Field of Classification Search
CPC ......... F05D 2240/122; F05D 2240/121; F05D 2240/123; F05D 2240/124; F05D 2220/323; F01D 9/04; F01D 5/141; F02K 3/06; B64D 27/16
See application file for complete search history.

(56) References Cited

U.S. PATENT DOCUMENTS 3,883,264 A * 5/1975 Rao ........................ F04D 29/544
  415/209.1
3,995,970 A * 12/1976 Nobuyuki ............. F04D 29/668
  415/119

(Continued)

FOREIGN PATENT DOCUMENTS

CN  103696812 A  4/2014
DE  19612394  10/1997

(Continued)

OTHER PUBLICATIONS

European Patent Office, Extended European Search Report for corresponding EP Application No. 20207934.9, dated Mar. 24, 2021.

*Primary Examiner* — Woody A Lee, Jr.
*Assistant Examiner* — Jesse M Prager
(74) *Attorney, Agent, or Firm* — Dority & Manning, P.A.

(57) ABSTRACT

A turbomachine defines an axial direction, a radial direction perpendicular to the axial direction, and a circumferential direction extending concentrically around the axial direction. The turbomachine includes a nozzle having an inner platform, an outer platform, and an airfoil. The airfoil includes a leading edge, a trailing edge downstream of the leading edge, a pressure side surface, and a suction side surface opposite the pressure side surface. The trailing edge defines a circular arc between the inner platform and the outer platform.

15 Claims, 8 Drawing Sheets

(56) References Cited

U.S. PATENT DOCUMENTS

| | | | |
|---|---|---|---|
| 4,470,755 A * | 9/1984 | Bessay | F01D 5/141 415/191 |
| 4,504,189 A | 3/1985 | Lings | |
| 4,714,407 A | 12/1987 | Cox et al. | |
| 4,826,400 A | 5/1989 | Gregory | |
| 5,634,611 A * | 6/1997 | Marze | B64C 27/82 244/17.19 |
| 6,036,438 A | 3/2000 | Imai | |
| 6,099,248 A | 8/2000 | Mumm et al. | |
| 6,345,955 B1 | 2/2002 | Heffron et al. | |
| 6,508,630 B2 | 1/2003 | Liu et al. | |
| 6,755,612 B2 | 6/2004 | Shahpar et al. | |
| 7,645,119 B2 | 1/2010 | Nomura et al. | |
| 8,167,548 B2 | 5/2012 | Greim et al. | |
| 8,192,153 B2 | 6/2012 | Harvey et al. | |
| 8,317,466 B2 | 11/2012 | Sakamoto et al. | |
| 8,480,372 B2 | 7/2013 | Sparks | |
| 8,632,311 B2 | 1/2014 | Klasing et al. | |
| 9,683,449 B2 | 6/2017 | He et al. | |
| 10,443,399 B2 | 10/2019 | Jones et al. | |
| 2002/0197156 A1 | 12/2002 | Haller | |
| 2004/0091353 A1 | 5/2004 | Shahpar et al. | |
| 2008/0152501 A1 | 6/2008 | Greim et al. | |
| 2010/0284801 A1 | 11/2010 | Greim et al. | |
| 2011/0038733 A1 | 2/2011 | Hofmann et al. | |
| 2011/0164970 A1 | 7/2011 | Greim et al. | |
| 2012/0027568 A1 | 2/2012 | Haller | |
| 2012/0183411 A1 | 7/2012 | Haller | |
| 2012/0189441 A1 | 7/2012 | Haller et al. | |
| 2013/0209246 A1 * | 8/2013 | Gbadebo | F01D 5/141 415/207 |
| 2018/0023403 A1 | 1/2018 | Jones et al. | |
| 2018/0298760 A1 * | 10/2018 | Subramaniyan | F01D 9/041 |
| 2020/0149415 A1 * | 5/2020 | Arisi | F01D 5/187 |
| 2020/0232327 A1 | 7/2020 | Haller | |

FOREIGN PATENT DOCUMENTS

| | | |
|---|---|---|
| DE | 19612396 A1 | 10/1997 |
| EP | 0916812 A1 | 5/1999 |
| EP | 0980960 A2 | 2/2000 |
| EP | 1612372 A1 | 1/2006 |
| EP | 1710397 | 10/2006 |
| EP | 1967694 | 9/2008 |
| EP | 2103782 A1 | 9/2009 |
| EP | 2412922 A1 | 2/2012 |
| EP | 3358134 A1 | 8/2018 |
| FR | 3050227 A1 | 10/2017 |
| GB | 2164098 A | 3/1986 |
| JP | 2003090279 A | 3/2003 |
| JP | 4838733 B2 | 12/2011 |
| KR | 101173725 B1 | 8/2012 |

* cited by examiner

FIG. 9

TURBOMACHINE NOZZLE WITH AN AIRFOIL HAVING A CIRCULAR TRAILING EDGE

FIELD

The present disclosure generally relates to turbomachines. More particularly, the present disclosure relates to stator vanes for turbomachines.

BACKGROUND

A gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The turbine section generally includes a plurality of stator vanes, sometimes also referred to as nozzles. Each stator vane includes an airfoil positioned within the flow of the combustion gases. The airfoil of the stator vane typically extends radially outward from an inner platform to an outer platform.

The airfoil may extend from a leading edge to a trailing edge downstream of the leading edge and may define aerodynamic surfaces therebetween, such as a pressure side surface and a suction side surface. The intersections of the aerodynamic surfaces with the inner and outer platforms may create areas of relatively high secondary losses. Some airfoils are provided with curvilinear shapes to reduce such secondary losses; however, the known curvilinear shapes may result in other inefficiencies such as inefficiencies due to increased throat spacing between vanes.

Accordingly, an airfoil for a stator vane that provides both reduced secondary losses at the outer platform and efficient overall aerodynamic performance would be useful. Additionally, an airfoil which promotes ease of installation of internal components is desired in the art.

BRIEF DESCRIPTION

Aspects and advantages of the technology will be set forth in part in the following description, or may be obvious from the description, or may be learned through practice of the technology.

In accordance with one embodiment, an airfoil for a stator vane for a turbomachine is provided. The turbomachine defines an axial direction, a radial direction perpendicular to the axial direction, and a circumferential direction extending concentrically around the axial direction. The airfoil extends radially between an inner platform of the stator vane and an outer platform of the stator vane. The airfoil includes a leading edge extending across the airfoil from the inner platform to the outer platform and a trailing edge downstream of the leading edge along a flow direction. The trailing edge extends across the airfoil from the inner platform to the outer platform. The airfoil also includes a pressure side surface that extends between the inner platform and the outer platform and extends between the leading edge and the trailing edge. The airfoil further includes a suction side surface extending between the inner platform and the outer platform and extending between the leading edge and the trailing edge. The suction side surface is opposite the pressure side surface. The trailing edge defines a circular arc between the inner platform and the outer platform.

In accordance with another embodiment, a turbomachine is provided. The turbomachine defines an axial direction, a radial direction perpendicular to the axial direction, and a circumferential direction extending concentrically around the axial direction. The turbomachine includes a compressor, a combustor disposed downstream from the compressor, and a turbine disposed downstream from the combustor. The turbine includes a stator vane having an inner platform, an outer platform, and an airfoil. The airfoil of the stator vane includes a leading edge extending across the airfoil from the inner platform to the outer platform and a trailing edge downstream of the leading edge along a flow direction. The trailing edge extends across the airfoil from the inner platform to the outer platform. The airfoil also includes a pressure side surface that extends between the inner platform and the outer platform and extends between the leading edge and the trailing edge. The airfoil further includes a suction side surface extending between the inner platform and the outer platform and extending between the leading edge and the trailing edge. The suction side surface is opposite the pressure side surface. The trailing edge defines a circular arc between the inner platform and the outer platform.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, terms of approximation, such as "generally" or "about," include values within ten percent greater or less than the stated value. When used in the context of an angle or direction, such terms include values within ten degrees greater or less than the stated angle or direction. For example, "generally vertical" includes directions within ten degrees of vertical in any direction, e.g., clockwise or counter-clockwise.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Although an industrial or land-based gas turbine is shown and described herein, the present technology as shown and described herein is not limited to a land-based and/or industrial gas turbine, unless otherwise specified in the claims. For example, the technology as described herein may be used in any type of turbomachine including, but not limited to, aviation gas turbines (e.g., turbofans, etc.), steam turbines, and marine gas turbines.

Figure 1:
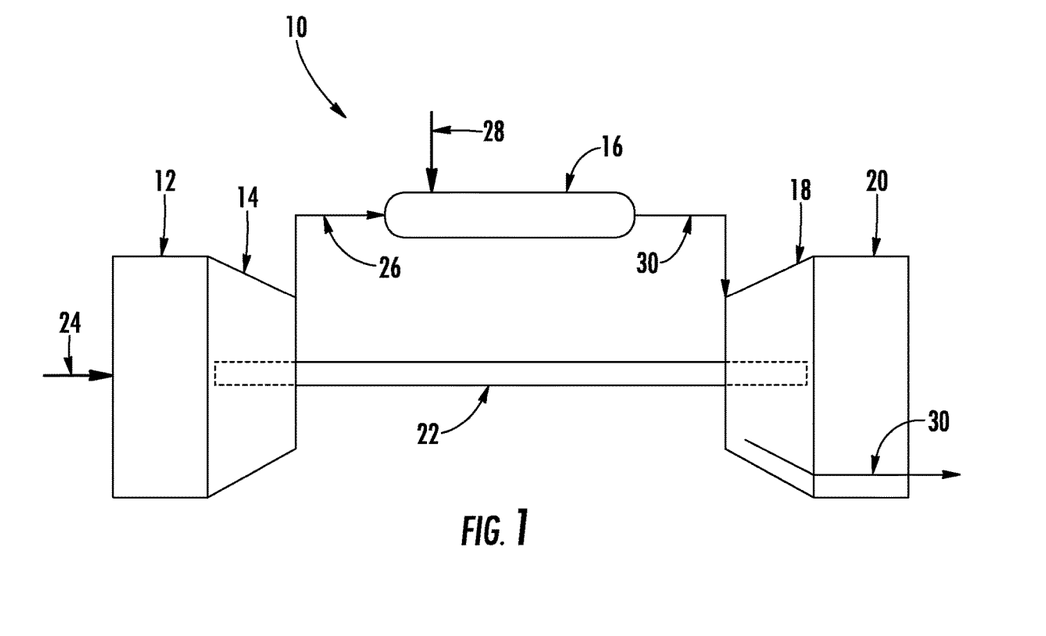
FIG. 1 is a schematic view of an exemplary gas turbine engine in accordance with one or more example embodiments of the present disclosure.

Referring now to the drawings, wherein identical numerals indicate the same elements throughout the figures, FIG. 1 schematically illustrates a gas turbine engine 10. It should be understood that the gas turbine engine 10 of the present disclosure need not be a gas turbine engine, but rather may be any suitable turbomachine, such as a steam turbine engine or other suitable engine. The gas turbine engine 10 may include an inlet section 12, a compressor section 14, a combustion section 16, a turbine section 18, and an exhaust section 20. The compressor section 14 and turbine section 18 may be coupled by a shaft 22. The shaft 22 may be a single shaft or a plurality of shaft segments coupled together to form the shaft 22.

During operation, a working fluid such as air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. The combustion gases 30 flow from the combustor 16 into the turbine 18, where energy (kinetic and/or thermal) is transferred from the combustion gases 30 to rotor blades, thus causing shaft 22 to rotate. The mechanical rotational energy may then be used for various purposes, such as to power the compressor 14 and/or to generate electricity. The combustion gases 30 exiting the turbine 18 may then be exhausted from the gas turbine 10 via the exhaust section 20.

As noted in FIGS. 3-9, the gas turbine 10 may define an axial direction A, e.g., along or parallel to the shaft 22, a radial direction R perpendicular to the axial direction A, and a circumferential direction C extending concentrically around the axial direction A.

Figure 2:
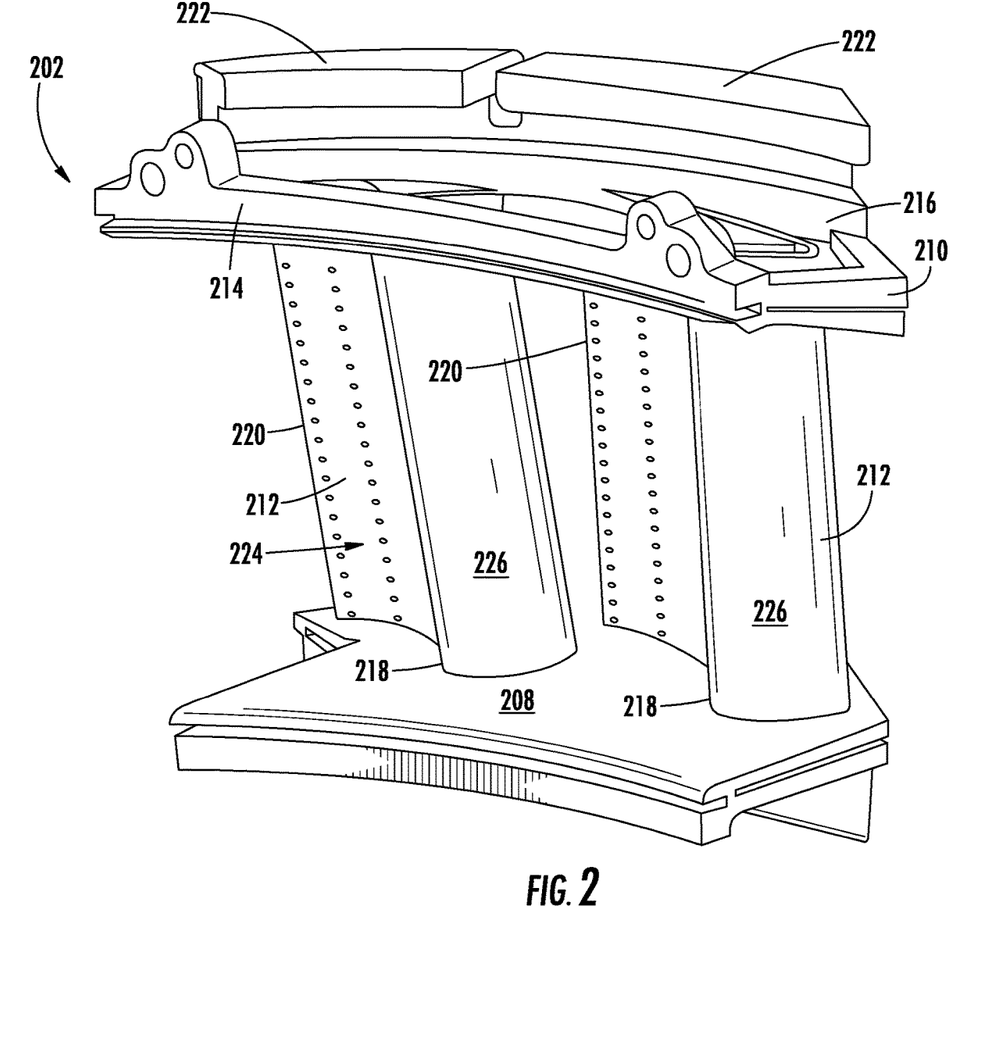
FIG. 2 is a perspective view of an exemplary turbine nozzle as may incorporate one or more embodiments of the present disclosure.

FIG. 2 provides a perspective view of an exemplary turbine nozzle 202, e.g., as may be incorporated into the turbine 18 shown in FIG. 1 in various embodiments of the present disclosure. As illustrated in FIG. 2, in some embodiments, the turbine nozzle 202 includes an inner platform 208 and an outer platform 210 radially spaced apart from the inner platform 208, e.g., along the radial direction R. The outer platform may extend along the axial direction A between a forward sidewall 214 and an aft sidewall 216.

In the illustrated example of FIG. 2, a pair of airfoils 212 extends in span from the inner platform 208 to the outer platform 210. In this respect, the example turbine nozzle 202 illustrated in FIG. 2 is referred to in the industry as a doublet. Nevertheless, the turbine nozzle 202 may have only one airfoil 212 (i.e., a singlet), three airfoils 212 (i.e., a triplet), or more airfoils 212.

Each airfoil 212 includes a leading edge 218 at a forward end of the airfoil 212 and a trailing edge 220 at an aft end of the airfoil 212. The nozzle 202 may also include one or more aft hooks 222 configured to engage with an adjacent shroud (not shown) of the turbomachine, e.g., gas turbine 10. For example, the nozzle 202 may include an aft hook 222 corresponding to each airfoil 212, e.g., a doublet may have two aft hooks 222.

Each airfoil 212 includes a pressure side surface 224 and an opposing suction side surface 226. The pressure side surface 224 and the suction side surface 226 are joined together or interconnected at the leading edge 218 of the airfoil 212, which is oriented into the flow of combustion gases 30 (FIG. 1). The pressure side surface 224 and the suction side surface 226 are also joined together or interconnected at the trailing edge 220 of the airfoil 212 spaced downstream from the leading edge 218. The pressure side surface 224 and the suction side surface 226 are continuous about the leading edge 218 and the trailing edge 220. The pressure side surface 224 is generally concave, and the suction side surface 226 is generally convex.

Figure 3:
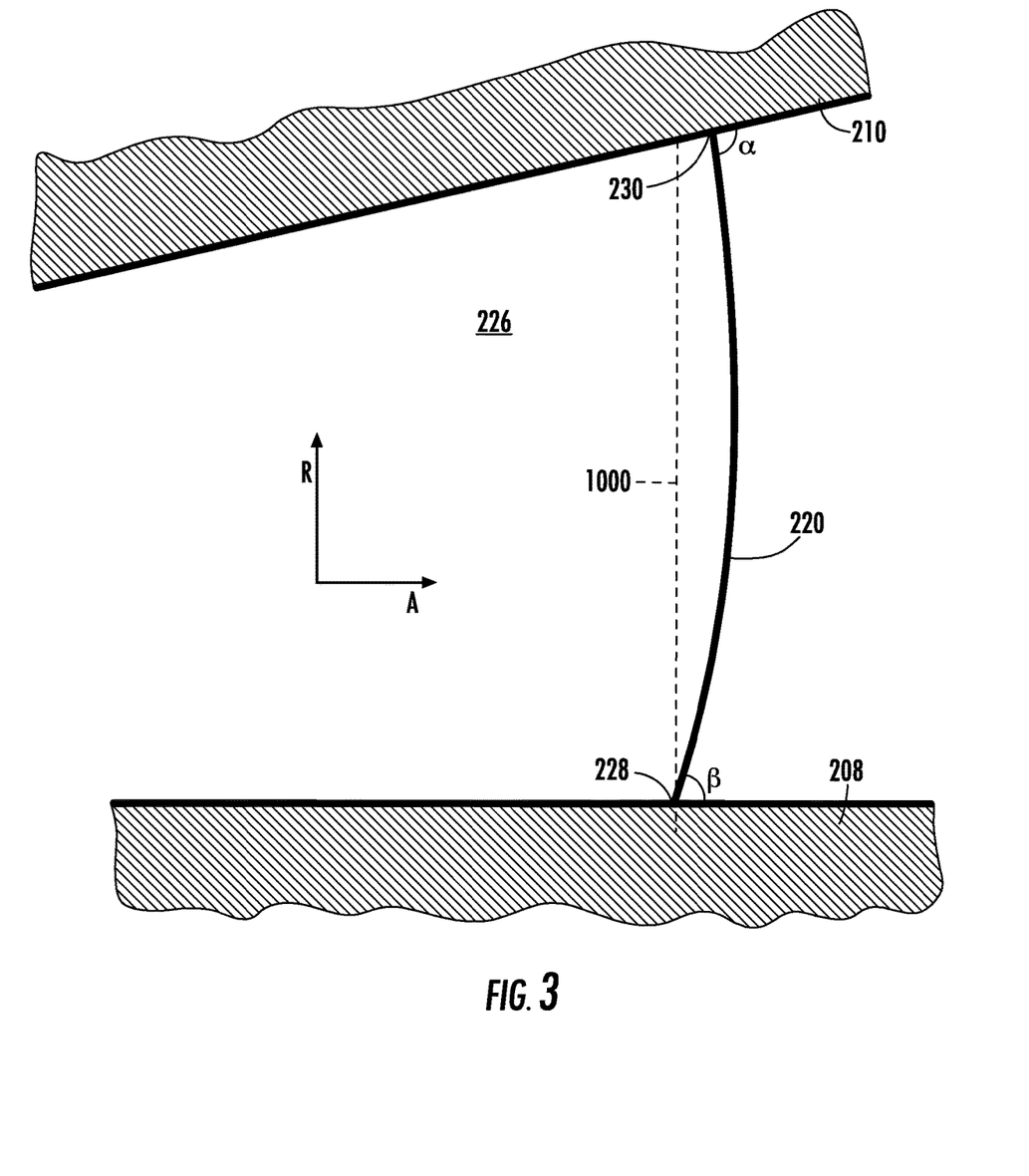
FIG. 3 is a side view of a trailing edge of an airfoil of a stator vane, according to one or more example embodiments of the present disclosure.

FIG. 3 is a side view of a trailing edge portion of an airfoil 212 of a stator vane 202, with portions of the inner platform 208 and the outer platform 210 shown in section. The trailing edge portion may be the downstream half of the airfoil 212 at and around the trailing edge 220 of the airfoil 212.

As may be seen in FIG. 3, the trailing edge 220 intersects the inner platform 208 at a first point 228 and forms an inner angle with the inner platform 208 at the first point 228. As may also be seen in FIG. 3, the trailing edge 220 intersects the outer platform 210 at a second point 230 and forms an outer angle α with the outer platform 210 at the second point 230. The second point 230 may be downstream of the first point 228. In particular, the second point 230 may be downstream of a radial projection line 1000 extending along the radial direction R through the first point 228 as noted in FIG. 3.

Further, as may be seen in FIG. 3, the trailing edge 220 projection in the axial-radial direction defines a curve bowed in the downstream flow direction with the outer platform intersection point 230 not upstream of the inner platform intersection point 228. Instead, as illustrated in FIG. 3, the outer platform intersection point 230 is downstream of the inner platform intersection point 228 or is axially aligned in other embodiments (not shown). In some embodiments, the trailing edge 220 may be orthogonal to the outer platform 210 and oblique to the inner platform 208. For example, the outer angle α may be about 90° and the inner angle β may be not equal to 90°, e.g., the inner angle β may be less than 90°.

Figure 4:
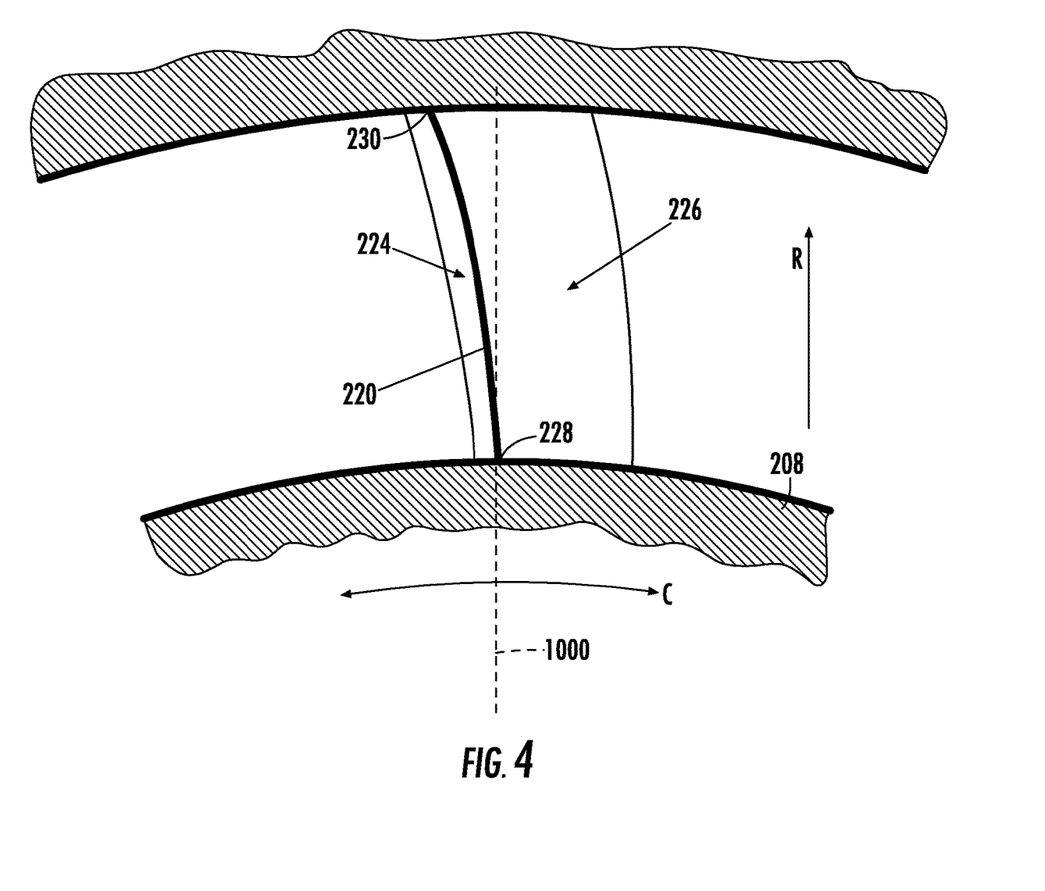
FIG. 4 is a trailing edge view looking upstream at a stator vane, according to one or more example embodiments of the present disclosure.
Figure 5:
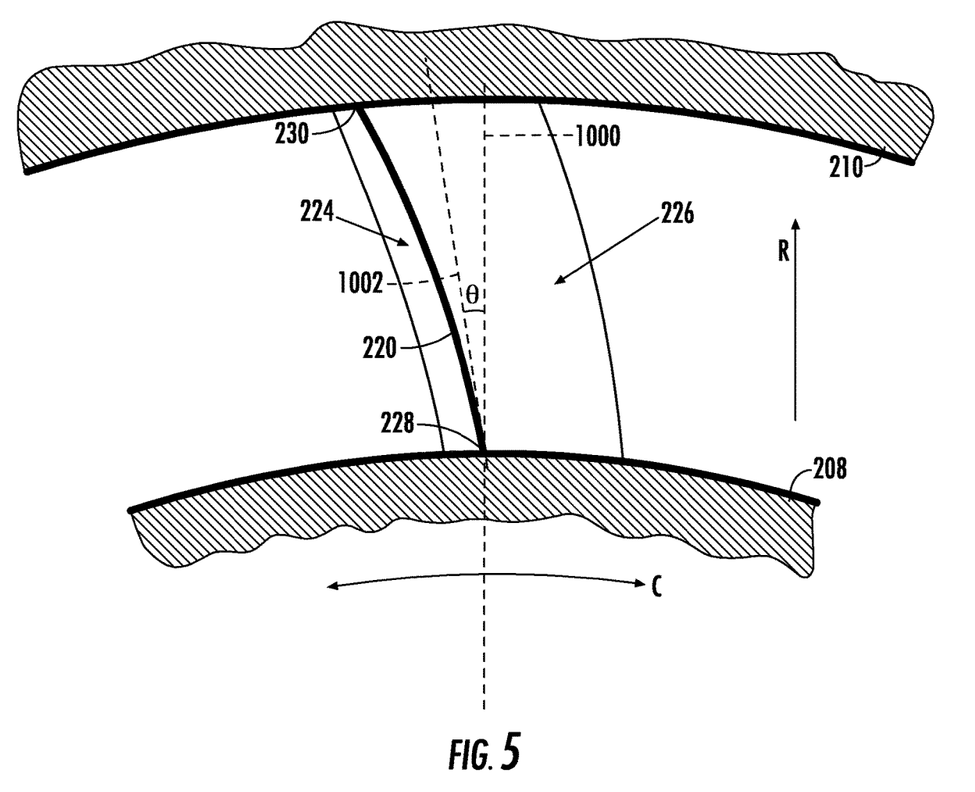
FIG. 5 is a trailing edge view looking upstream at a stator vane, according to one or more example embodiments of the present disclosure.

FIG. 4 is a trailing edge view looking upstream at the airfoil 212 of the stator vane 202, according to one or more exemplary embodiments. FIGS. 4 and 5 illustrate embodiments of the airfoil 212 as seen in a plane perpendicular to the axial direction A, e.g., a radial-circumferential plane defined by the radial direction R and the circumferential direction C. As may be seen in FIG. 4, in some embodiments, the trailing edge 220 may be curved with respect to the radial direction R, such as relative to the radial projection line 1000 extending through the intersection 228 of the trailing edge 220 with the inner platform 208, in a manner that that places the pressure side surface 224 of every profile section angled towards the center of the engine, e.g., towards the shaft 22 and/or the axial centerline thereof, with the respect to a neighboring profile section at a lower radius, e.g., closer to the inner platform 208.

In some embodiments, as illustrated in FIG. 4, the inner portion of the trailing edge 220 may be tangential to the radial direction R with the intersection 230 of the trailing edge 220 with the outer platform 210 being circumferentially offset from the radial projection line 1000. In other embodiments, as illustrated in FIG. 5, the trailing edge 220 may be tilted relative to the radial direction R. For example, the inner portion of the trailing edge 220 may be tangential to a second line 1002 which is tilted at an angle Θ with respect to the radial direction R, e.g., forming an angle Θ with the radial projection line 1000.

Figure 6:
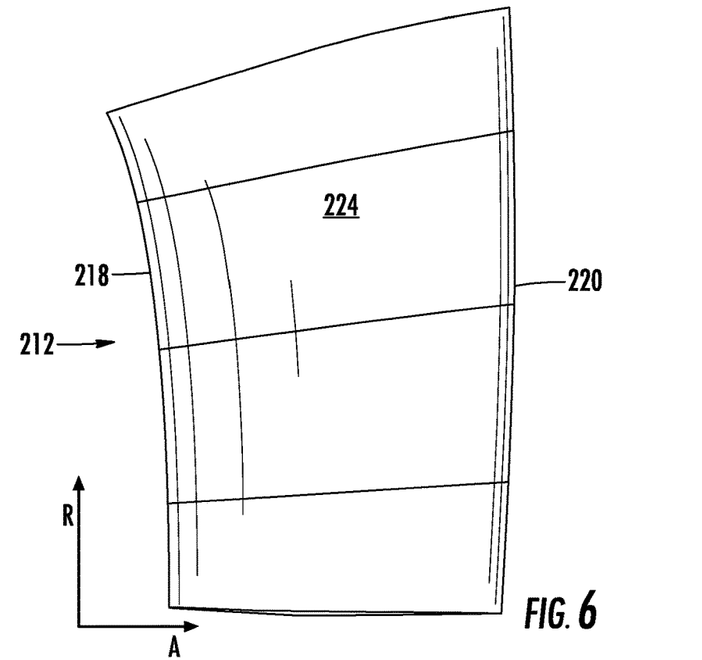
FIG. 6 is a side view of a stator vane, according to one or more example embodiments of the present disclosure.
Figure 7:
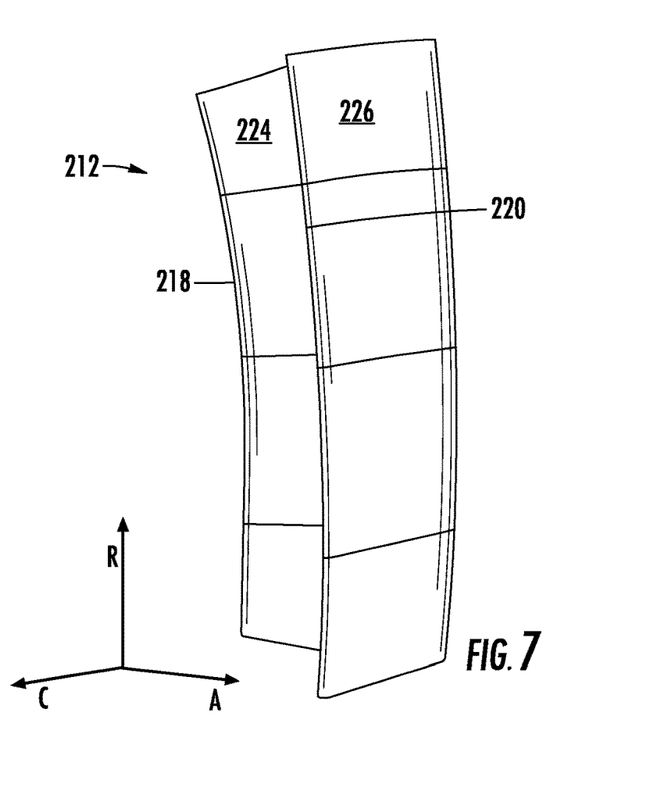
FIG. 7 is a trailing edge perspective view of the stator vane of FIG. 6.

FIGS. 6 and 7 provide additional illustrations of further examples of an airfoil 212 for a stator vane 202, according to various embodiments of the present disclosure. The inner and outer platforms 208 and 210 are not depicted in FIGS. 6 and 7 for simplicity and to more clearly depict the shape of the airfoil 212. For example, FIGS. 6 and 7 illustrate an embodiment of an airfoil 212 having a curvilinear trailing edge 220, which is radially stacked in a manner that places the pressure side 224 of every profile section angled towards the center of the engine, e.g., as described above with respect to FIG. 4. The downstream bow of the trailing edge 220 curvature, e.g., as mentioned above with respect to FIG. 3, may also be seen in the example embodiment illustrated in FIGS. 6 and 7.

Figure 8:
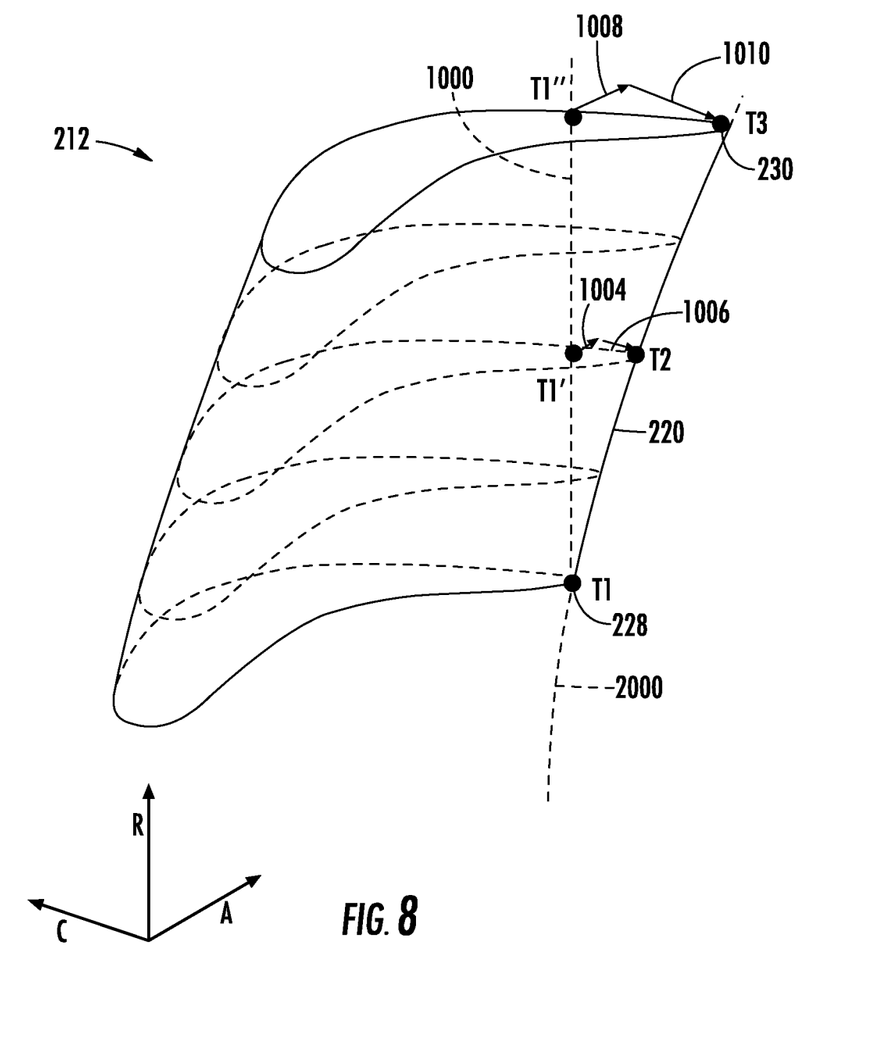
FIG. 8 is a perspective view of an airfoil of a stator vane, according to one or more example embodiments of the present disclosure.
Figure 9:
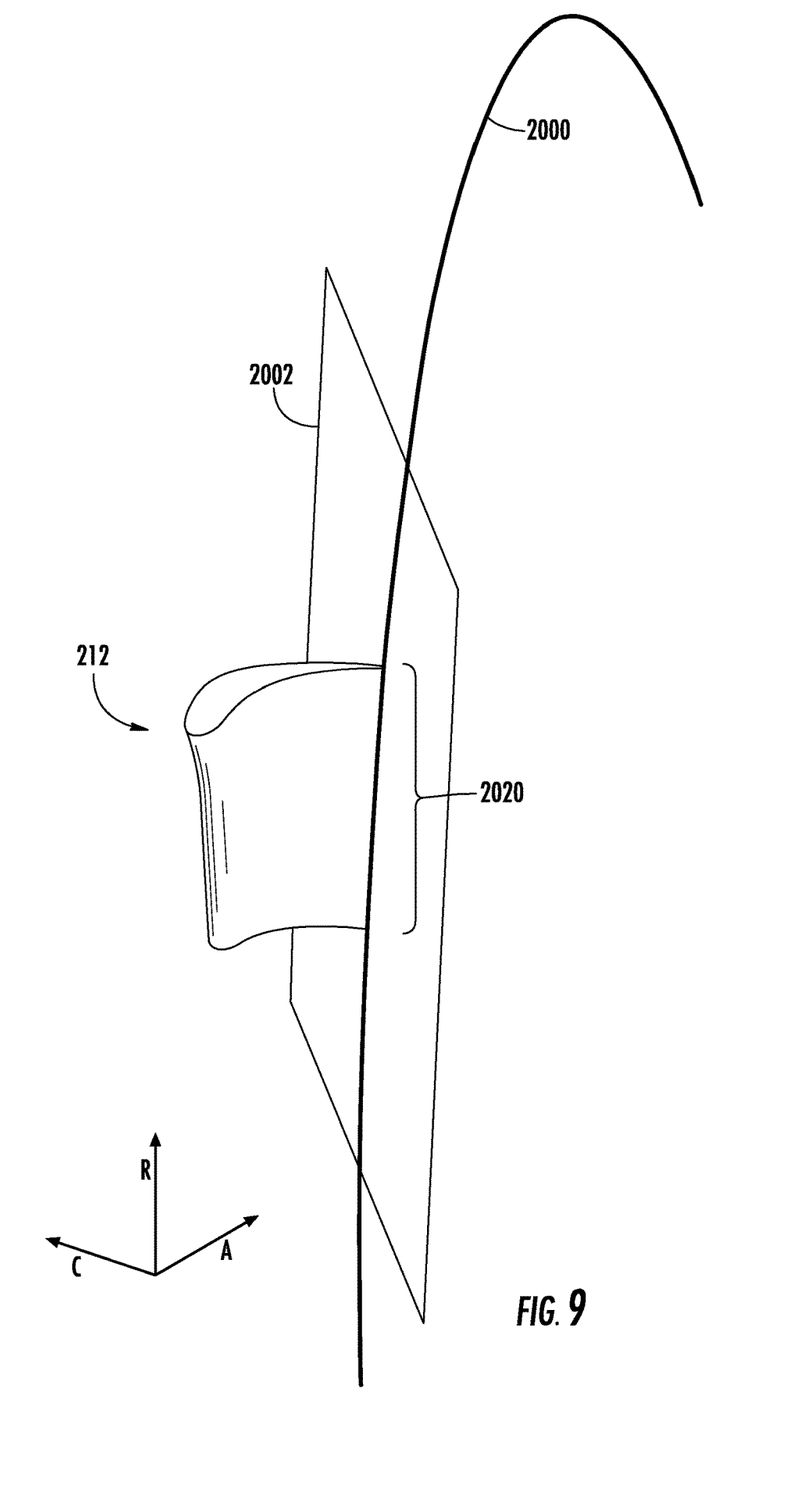
FIG. 9 is a perspective view of an airfoil of a stator vane according to one or more example embodiments of the present disclosure.

Turning now to FIGS. 8 and 9, the trailing edge 220 of the airfoil 212 may be circular. For example, as illustrated in FIGS. 8 and 9, the trailing edge 220 may define a circular arc 2020, which lies along, e.g., is a portion of, an imaginary circle 2000.

Turning specifically to FIG. 8, the trailing edge 220 may extend from a first point T1 on the circle 2000 at an innermost point on the trailing edge 220 (e.g., the first point 228 where the trailing edge 220 intersects the inner platform 208, as shown in FIG. 3) to a second point T2 on the circle 2000, which may be a mid-span point on the airfoil (e.g., at or about halfway between the inner platform 208 and the outer platform 210), and from the second, mid-span point T2 to an outer point T3, which may be an outermost point on the trailing edge 220 (e.g., the second point 230 where the trailing edge 220 intersects the outer platform 210, as shown in FIG. 3).

As shown in FIG. 8, the first point T1 on the circle 2000 lies on the radial projection line 1000, while the successive points are offset from the first point T1 and thus also offset from the radial projection line 1000. More specifically, the second point T2 may be offset from a mid-span point T1' on the radial projection line 1000 by a first axial distance 1004 along the axial direction A and by a first circumferential distance 1006 along the circumferential direction C. As illustrated in FIG. 8, in some embodiments, the first axial distance 1004 is not equal to the first circumferential distance 1006.

Further, the third point T3 on the circle 2000 may be offset from an outermost point T1" on the radial projection line 1000 by a second axial distance 1008 along the axial direction A and by a second circumferential distance 1010 along the circumferential direction C. As illustrated in FIG. 8, the trailing edge 220 diverges further from the radial direction R, e.g., from the radial projection line 1000 moving outward along the trailing edge 220. Thus, the second axial distance 1008 may be greater than the first axial distance 1004, and the second circumferential distance 1010 may be greater than the first circumferential distance 1006, e.g., the trailing edge 220 may diverge from the radial direction R both axially and circumferentially.

As shown in FIG. 9, the circle 2000 on which the trailing edge 220 lies, e.g., the circle 2000 of which the circular arc 2020 defined by the trailing edge 220 is a portion, may lie in a plane 2002. The plane 2002 in which the circle 2000 lies may be an oblique plane with respect to the turbomachine, e.g., gas turbine 10. For example, as may be seen in FIG. 9, the plane 2002 may not be parallel to any of the cartesian planes defined by the axis of the machine. For example, the plane 2002 may not be parallel to the radial direction R, the axial direction A, or the circumferential direction C. Thus, the plane 2002 may be neither an axial-radial plane nor a circumferential-radial plane.

The circular trailing edge 220 may have numerous advantages. For example, the circular trailing edge 220 may provide aerodynamic benefits, such as improved efficiency and reduced loses, e.g., due to a relatively short axial distance between the nozzle and a downstream rotor blade. As another example, the circular trailing edge 220 may also promote ease of installation of internal components of the stator vane 202. For instance, the stator vane 212, and in particular the airfoil 212 thereof, may include internal cooling structures, such as one or more baffles that define cooling channels for a coolant, e.g., air, to flow through and within the airfoil 212, as is generally understood by those of ordinary skill in the art. Such internal cooling structures may be formed separately from the airfoil 212 and may be inserted into the airfoil 212 by rotating the internal cooling structure along the circle 2000.

This written description uses examples to disclose the technology, including the best mode, and also to enable any person skilled in the art to practice the technology, including making and using any devices or systems and performing any incorporated methods. The patentable scope of the technology is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A stator vane for a turbomachine, the turbomachine defining an axial direction, a radial direction perpendicular to the axial direction, and a circumferential direction extending concentrically around the axial direction, the stator vane comprising:
an inner platform;
an outer platform; and
an airfoil extending radially between the inner platform and the outer platform, the airfoil comprising:
a leading edge extending across the airfoil from the inner platform to the outer platform;
a trailing edge downstream of the leading edge along a flow direction, the trailing edge extending across the airfoil from a first point intersecting the inner platform through a mid-span point to a second point intersecting the outer platform, wherein a radial projection extends through the first point, wherein the trailing edge diverges both axially and circumferentially away from the radial projection from the first point to the second point such that the mid-span point is closer to the radial projection than the second point in both the axial direction and the circumferential direction, and wherein the trailing edge diverges away from the radial projection in the circumferential direction further than the trailing edge diverges from the radial projection in the axial direction as the trailing edge extends from the first point to the second point;
a pressure side surface extending between the inner platform and the outer platform and extending between the leading edge and the trailing edge, wherein the entire pressure side surface is angled towards the inner platform; and
a suction side surface extending between the inner platform and the outer platform and extending between the leading edge and the trailing edge, the suction side surface opposing the pressure side surface, wherein the entire suction side surface is angled towards the outer platform;
wherein the trailing edge defines a circular arc between the inner platform and the outer platform, and wherein the circular arc is a portion of a circle, and the circle lies in a plane that is not parallel to an axial-radial plane or a circumferential-radial plane of the turbomachine.

2. The stator vane of claim 1, wherein the trailing edge is oblique to the inner platform in an axial-radial plane.

3. The stator vane of claim 2, wherein the trailing edge forms an angle of less than ninety degrees with the inner platform in the axial-radial plane.

4. The stator vane of claim 1, wherein the trailing edge curves outward along the flow direction between the first point and the second point.

5. The stator vane of claim 1, wherein the second point is not upstream of the first point.

6. The stator vane of claim 1, wherein the second point is downstream of the first point.

7. A turbomachine defining an axial direction, a radial direction perpendicular to the axial direction, and a circumferential direction extending concentrically around the axial direction, the turbomachine comprising;
a compressor;
a combustor disposed downstream from the compressor; and
a turbine disposed downstream from the combustor, the turbine including a stator vane having an inner platform, an outer platform, and an airfoil, the airfoil of the stator vane comprising:
a leading edge extending across the airfoil from the inner platform to the outer platform;
a trailing edge downstream of the leading edge along a flow direction, the trailing edge extending across the airfoil from a first point intersecting the inner platform through a mid-span point to a second point intersecting the outer platform, wherein a radial projection extends through the first point, wherein the trailing edge diverges both axially and circumferentially away from the radial projection from the first point to the second point such that the mid-span point is closer to the radial projection than the second point in both the axial direction and the circumferential direction, and wherein the trailing edge diverges away from the radial projection in the circumferential direction further than the trailing edge diverges from the radial projection in the axial direction as the trailing edge extends from the first point to the second point;
a pressure side surface extending between the inner platform and the outer platform and extending between the leading edge and the trailing edge, wherein the entire pressure side surface is angled towards the inner platform; and
a suction side surface extending between the inner platform and the outer platform and extending between the leading edge and the trailing edge, the suction side surface opposing the pressure side surface, wherein the entire suction side surface is angled towards the outer platform;
wherein the trailing edge defines a circular arc between the inner platform and the outer platform.

8. The turbomachine of claim 7, wherein the circular arc is a portion of a circle, and the circle lies in a plane which is not parallel to the axial direction or the radial direction.

9. The turbomachine of claim 7, wherein the circular arc is a portion of a circle, and the circle lies in a plane which is not parallel to the circumferential direction or the radial direction.

10. The turbomachine of claim 7, wherein the trailing edge is oblique to the inner platform in an axial-radial plane.

11. The turbomachine of claim 10, wherein the trailing edge forms an angle of less than ninety degrees with the inner platform in the axial-radial plane.

12. The turbomachine of claim 7, wherein the trailing edge curves outward along the flow direction between the first point and the second point.

13. The turbomachine of claim 7, wherein the second point is not upstream of the first point.

14. The turbomachine of claim 7, wherein the second point is downstream of the first point.

15. The stator vane of claim 1, wherein the trailing edge diverges away from the radial projection line in a direction that the pressure side faces.

* * * * *